United States Patent

Shindo et al.

[11] Patent Number: 6,164,150
[45] Date of Patent: Dec. 26, 2000

[54] VEHICLE STEERING APPARATUS

[75] Inventors: Masahiko Shindo, Shizuoka-ken; Morihiro Matsuda, Susono; Junji Kawamuro, Susono; Takahiro Kojo, Susono, all of Japan

[73] Assignee: Toyota Jidosha Kabushiki Kaisha, Toyota, Japan

[21] Appl. No.: 09/066,564

[22] Filed: Apr. 27, 1998

[30] Foreign Application Priority Data

| May 23, 1997 | [JP] | Japan | 9-133736 |
| May 23, 1997 | [JP] | Japan | 9-133740 |
| Feb. 17, 1998 | [JP] | Japan | 10-034828 |

[51] Int. Cl.⁷ ..................................................... B62D 5/04
[52] U.S. Cl. ...................... 74/388 PS; 180/404; 180/444
[58] Field of Search ................ 74/388 PS; 180/443, 180/444, 446, 447, 404, 405; 475/4

[56] References Cited

U.S. PATENT DOCUMENTS

| 4,556,116 | 12/1985 | O'Neil | 180/404 |
| 4,573,545 | 3/1986 | Kalns | 180/404 |
| 4,715,462 | 12/1987 | Taig | 74/388 PS |
| 4,765,425 | 8/1988 | Saito et al. | 74/388 PS |
| 4,940,105 | 7/1990 | Matsunaga et al. | 74/388 PS |
| 5,230,397 | 7/1993 | Trachon | 74/388 PS |

FOREIGN PATENT DOCUMENTS

| 38 30 654 A1 | 11/1989 | Germany . |
| 40 09 400 A1 | 9/1991 | Germany . |
| 43 04 664 A1 | 8/1994 | Germany . |
| 62-20755 | 1/1987 | Japan . |
| 63-93673 | 4/1988 | Japan . |
| 3-153467 | 7/1991 | Japan . |
| 6-336163 | 12/1994 | Japan . |

*Primary Examiner*—David A. Bucci
*Assistant Examiner*—William C Joyce
*Attorney, Agent, or Firm*—Oliff & Berridge, PLC

[57] ABSTRACT

A vehicle steering apparatus having a variable gear ratio unit arranged midway along a steering transmission system for connecting a steering wheel and a tire to change a transmission ratio upon driving a motor includes a connecting unit for stopping actuation of the variable gear ratio unit in accordance with an external signal to connect the input side of the variable gear ratio unit which is connected to the steering wheel to the output side of the variable gear ratio unit which is connected to the tire. Even if a reverse input acts from a tire side during traveling, the relationship between the steering amount of the steering wheel and the turning amount of the tire can be kept unchanged.

1 Claim, 15 Drawing Sheets

VEHICLE STEERING APPARATUS

BACKGROUND OF THE INVENTION

1. Field of the Invention

The present invention relates to a vehicle steering apparatus capable of changing a transmission ratio of the steering angle of a steering wheel to the turning angle-of a tire.

2. Related Background Art

A steering apparatus disclosed in Japanese Patent Laid-Open No. 3-153467 is available as a conventional steering apparatus capable of changing the transmission ratio of the steering angle of the steering wheel to the turning angle of the tire. This steering apparatus comprises a transmission ratio change mechanism constituted by a planetary gear differential mechanism mounted on a steering shaft between a steering wheel and a pinion connected to a tire.

The transmission ratio change mechanism of this steering apparatus is of a differential type. For this reason, when an excessive load such as an excessive reverse input from a vehicle wheel or tire during traveling acts on the transmission ratio change mechanism, the transmission ratio change mechanism is moved by this load to change the relationship between the steering amount of the steering wheel and the turning amount of the tire.

SUMMARY OF THE INVENTION

It is an object of the present invention to provide a vehicle steering apparatus capable of maintaining the relationship between the steering amount of a steering wheel and the turning amount of a tire even if an excessive load acts on a transmission ratio change means during traveling.

In order to achieve the above object according to the present invention, there is provided a vehicle steering apparatus comprising transmission ratio change means, arranged midway along a steering transmission system for connecting a steering wheel and a turned wheel, for changing a transmission ratio by driving a motor, and connecting means for connecting a steering transmission system of the transmission ratio change means on a steering wheel side to a steering transmission system of the transmission ratio change means on a turned wheel side at a fixed transmission ratio.

According this vehicle steering apparatus, steering can be performed at the fixed transmission ratio by connecting the input and output sides of the transmission ratio change means in an abnormal state or a state in which an excessive reverse input acts. Therefore, the relationship between the steering amount of the steering wheel and the turning amount of the turned wheel does not change even if an excessive reverse input acts on the steering transmission system from the vehicle wheel side during traveling.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

A vehicle steering apparatus according to the first embodiment of the present invention will be described with reference to FIGS. 1 to 3.

Figure 1:
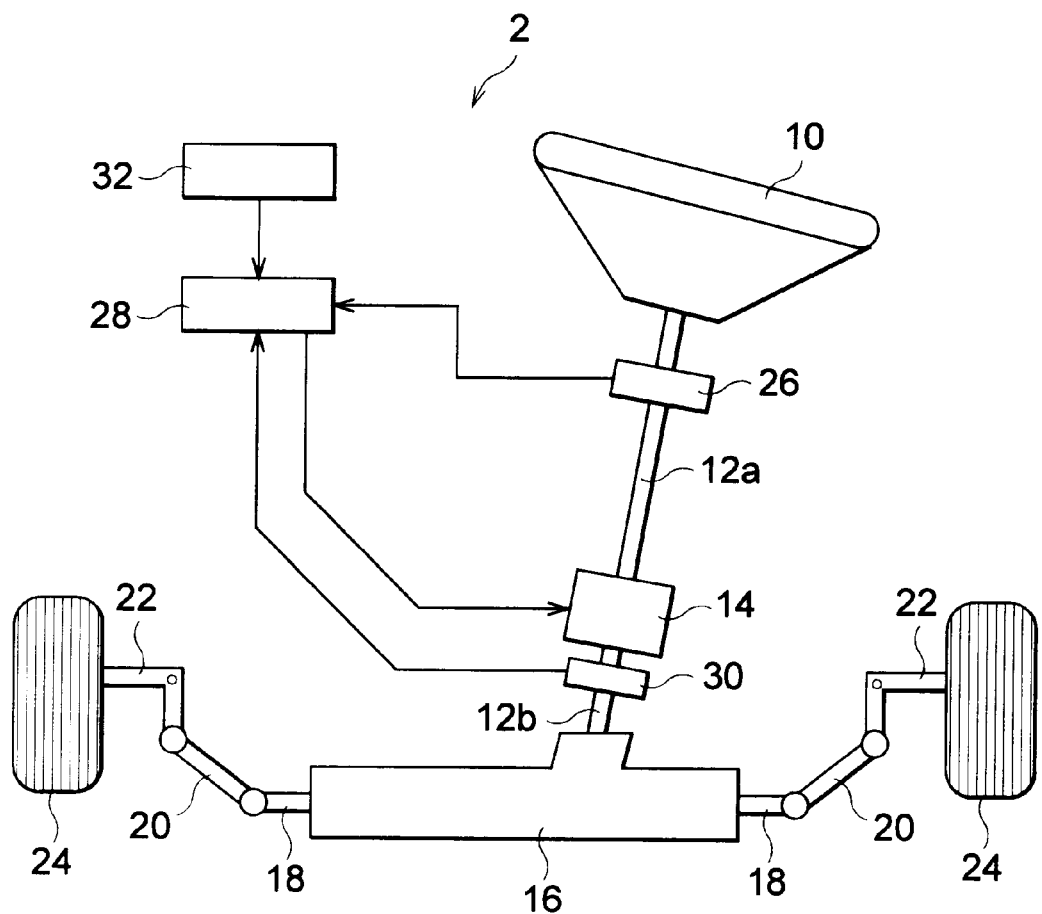
FIG. 1 is a view showing the structure of a vehicle steering apparatus according to the first embodiment.

FIG. 1 is a view showing the structure of a vehicle steering apparatus 2. Reference numeral 10 denotes a steering wheel. This steering wheel 10 is connected to the upper end of an upper steering shaft 12a serving as a steering transmission system. The lower end of the upper steering shaft 12a is connected to a variable gear ratio unit 14 serving as a transmission ratio change means. The upper end of a lower steering shaft 12b serving as a steering transmission system is connected to the variable gear ratio unit 14.

A pinion (not shown) is mounted on the lower end of the lower steering shaft 12b. This pinion meshes with a rack bar 18 in a steering gear box 16. Each of the two ends of the rack bar 18 is connected to one end of a corresponding one of tie rods 20. The other end of each tie rod 20 is connected to a corresponding one of tires 24 through a corresponding one of knuckle arms 22.

A steering angle sensor 26 for detecting the steering angle of the steering wheel 10 is mounted on the upper steering shaft 12a. An output angle sensor 30 for detecting the turning angle of the tire 24 is mounted on the lower steering shaft 12b. The steering angle of the steering wheel 10 which is detected by the steering angle sensor 26 and the turning angle of the tire 24 which is detected by the output angle sensor 30 are input to an ECU (Electronic Control Unit) 28. The ECU 28 also receives a vehicle speed output from a vehicle speed sensor 32 for detecting the vehicle speed. The ECU 28 outputs a control signal for controlling the variable gear ratio unit 14 to the variable gear ratio unit 14.

Figure 2:
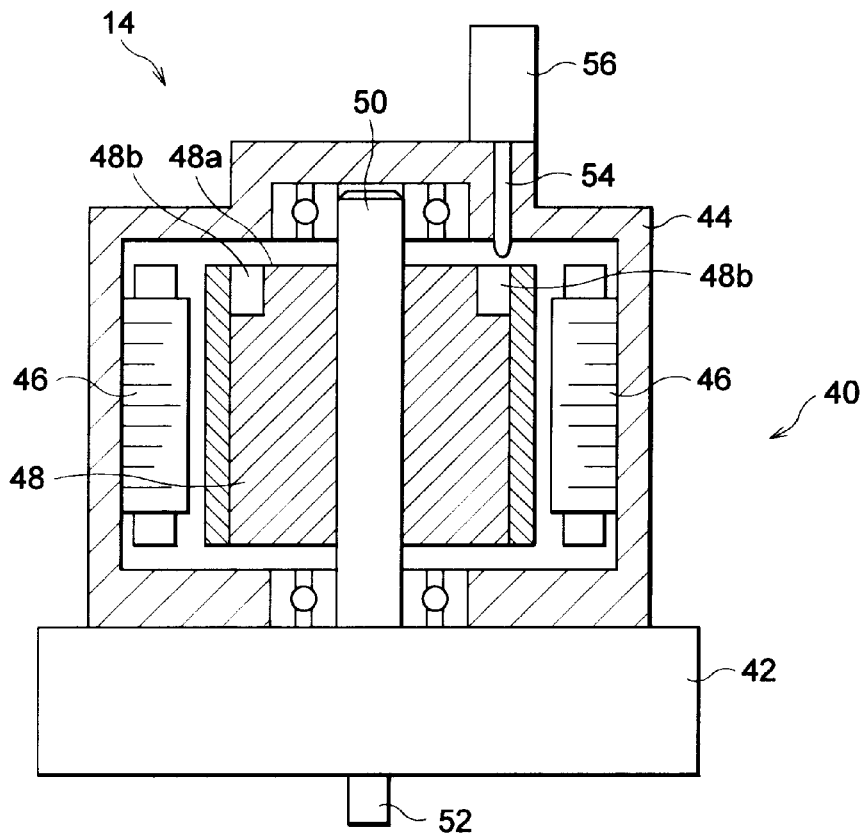
FIG. 2 is a sectional view showing the structure of a variable gear ratio unit of the vehicle steering apparatus according to the first embodiment.
Figure 3:
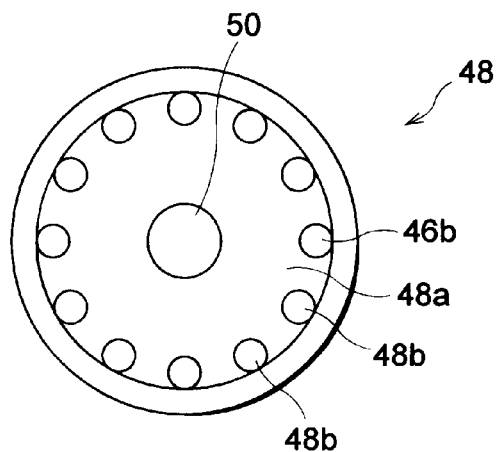
FIG. 3 is a plan view showing the rotor of the motor of a variable gear ratio unit according to the first embodiment.

As shown in FIG. 2, the variable gear ratio unit 14 comprises a motor 40 serving as a gear ratio change unit and a reducing unit 42 for reducing the input speed at a predetermined ratio. The motor 40 comprises a stator 46 and a rotor 48 which are mounted in a motor housing 44. The reducing unit 42 is constituted as a reducing unit using a planetary gear mechanism. More specifically, the rotation of a rotating shaft 50 rotating together with the rotor 48 is input to a sun gear (not shown) constituting the planetary gear mechanism, and rotation of a carrier 52 is output as an output from the reducing unit 42.

A solenoid 56 for displacing a slide pin 54 in a direction parallel to the axis of the rotating shaft 50 is mounted on the upper outer surface of the motor housing 44. The solenoid 56 is driven by a control signal from the ECU 28. When the control signal is input from the ECU 28 to the solenoid 56, the solenoid 56 displaces the slide pin 54 in the direction parallel to the axis of the rotating shaft 50. A plurality of pin holes 48b for receiving the slide pin 54 are circumferentially formed in an upper surface 48a of the rotor 48 at an almost equal angular interval, as shown in FIG. 3. More specifically, the slide pin 54, the solenoid 56, and the pin holes 48b for receiving the slide pin 54 constitute a connecting means in the variable gear ratio unit 14.

The upper part of the motor housing 44 is connected to the lower end of the upper steering shaft 12a through a universal joint (not shown). The carrier 52 is connected to the upper end of the lower steering shaft 12b.

In this vehicle steering apparatus 2, when the vehicle speed detected by the vehicle speed sensor 32 and the steering angle detected by the steering angle sensor 26 are input to the ECU 28, the ECU 28 calculates a target turning angle on the basis of the vehicle speed and the steering angle and outputs a control signal to the variable gear ratio unit 14 on the basis of the target turning angle. The motor 40 in the variable gear ratio unit 14 is driven on the basis of this control signal to supply a turning angle corresponding to the target turning angle to the tire 24.

In this vehicle steering apparatus 2, the ECU 28 determines the presence/absence of a reverse input (kick back) from the tire 24 side and the failure of the motor 40. More specifically, when the difference between the turning angle of the tire 24 which is detected by the output angle sensor 30 and the target turning angle calculated on the basis of the steering angle of the steering wheel 10 which is detected by the steering angle sensor 26 and the vehicle speed detected by the vehicle speed sensor 32 is equal to or larger than a predetermined value, the ECU 28 determines the presence of an excessive reverse input from the tire 24 side. When an electric current value supplied to the motor 40 exhibits an abnormal value, the ECU 28 determines the failure of the motor 40.

When the ECU 28 determines the presence of the excessive reverse input from the tire 24 side or the failure of the motor 40, the ECU 28 outputs a control signal to the solenoid 56 to displace the slide pin 54 in a direction parallel to the axis of the rotating shaft 50. When the slide pin 54 faces one of the pin holes 48b formed in the upper surface 48b of the rotor 48, the slide pin 54 is fitted in the facing pin hole 48b to fix the rotor 48 to the motor housing 44.

Since the motor 40 constitutes the gear ratio change portion of the variable gear ratio unit 14, the gear ratio does not change when the rotation of the rotor 48 to the motor housing 44 is restricted. Accordingly, the steering wheel 10 is substantially directly connected to the tires 24. Even if an excessive reverse input acts from the tire 24 side, a phase shift by the reverse input can be prevented.

When the failure of the motor 40 occurs, the steering wheel 10 is directly connected to the tires 24. Even if the motor 40 fails, steering can be performed at the fixed transmission ratio.

When an excessive reverse input from the tire 24 side or the failure of the motor 40 is eliminated, the ECU 28 outputs a control signal to the solenoid 56 to retract the slide pin 54 to release direct connection between the steering wheel 10 and the tires 24, thereby restarting actuation of the variable gear ratio unit 14.

Figure 4:
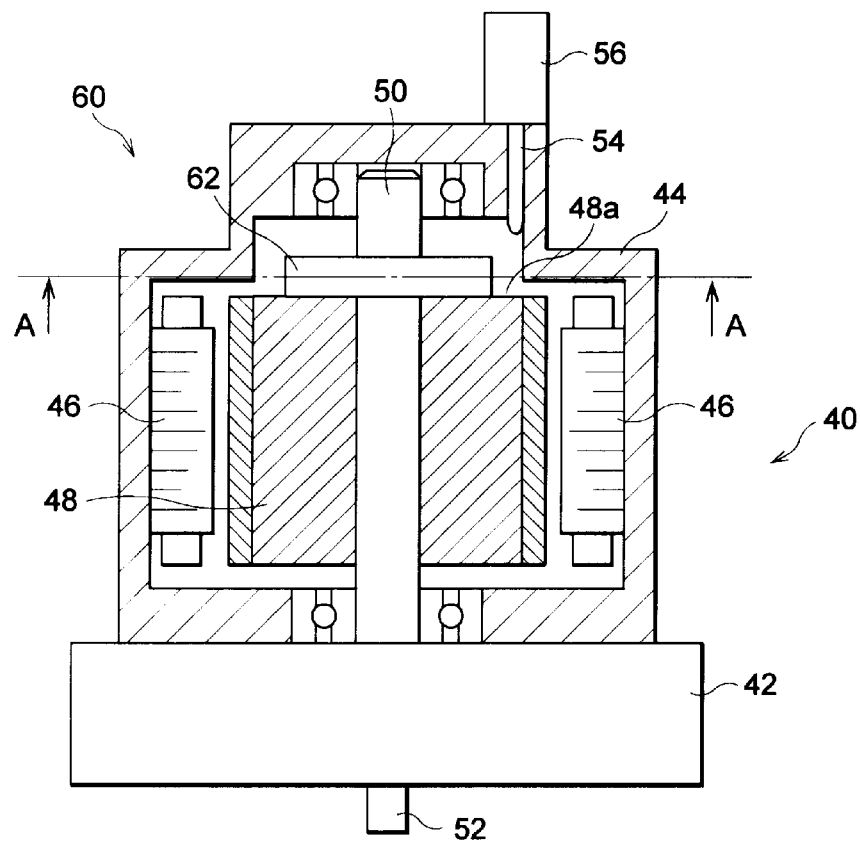
FIG. 4 is a sectional view showing the structure of the variable gear ratio unit of a vehicle steering apparatus according to the second embodiment.
Figure 5:
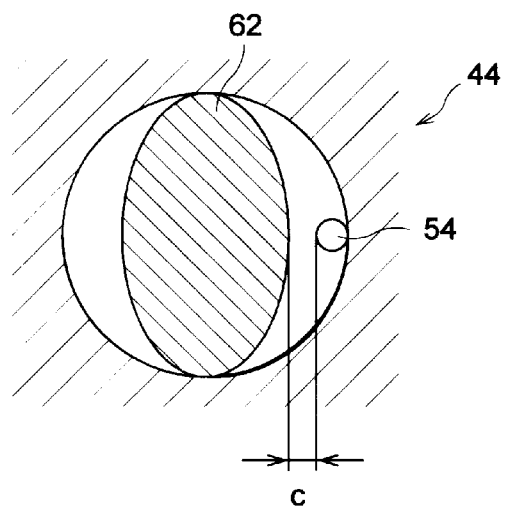
FIG. 5 is a partially sectional view of the variable gear ratio unit (FIG. 4) of the second embodiment along the line A—A.

A vehicle steering apparatus according to the second embodiment of the present invention will be described with reference to FIGS. 4 and 5. This vehicle steering apparatus is different from that of the first embodiment in that the variable gear ratio unit 14 of the vehicle steering apparatus of the first embodiment is replaced with a variable gear ratio unit 60. Note that the same reference numerals as in the variable gear ratio unit 14 of the first embodiment denote the same parts in the variable gear ratio unit 60 of the vehicle steering apparatus of the second embodiment, and a detailed description thereof will be omitted.

The variable gear ratio unit 60 comprises a motor 40 and a reducing unit 42 as in the variable gear ratio unit 14 of the first embodiment. The connecting means of the variable gear ratio unit 60 is an elliptical cam 62 unlike the first embodiment. More specifically, the elliptical cam 62 rotating together with a rotating shaft 50 is mounted on an upper surface 48a of a rotor 48.

In this vehicle steering apparatus, when an ECU 28 determines the presence of a reverse input from a tire 24 side or the failure of the motor 40 as in the first embodiment, the ECU 28 outputs a control signal to a solenoid 56 to displace a slide pin 54 in a direction parallel to the axis of the rotating shaft 50. The slide pin 54 is therefore inserted in a gap formed between the elliptical cam 62 and a motor housing 44.

In this state, when the elliptical cam 62 rotates together with the rotating shaft 50, the gap, i.e., a clearance C formed between the elliptical cam 62 and the motor housing 44 is reduced, and finally rotational motion of the rotor 48 with respect to the motor housing 44 is restricted.

Therefore, the motor housing 44 and the rotor 48 are substantially connected to each other with predetermined play.

The variable gear ratio unit 60 stops, and the steering wheel 10 is directly connected to the tires 24. Even if an excessive reverse input acts from the tire 24 side, a phase shift by the reverse input can be prevented.

Figure 6:
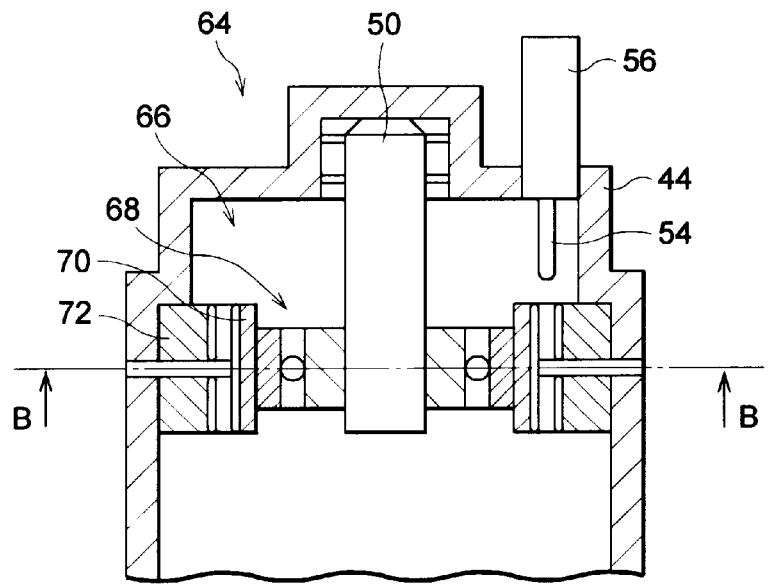
FIG. 6 is a sectional view showing the structure of the variable gear ratio unit of a vehicle steering apparatus according to third embodiment.

A vehicle steering apparatus according to the third embodiment of the present invention will be described with reference to FIGS. 6 and 7. This vehicle steering apparatus is different from that of the first embodiment in that the variable gear ratio unit 14 of the vehicle steering apparatus of the first embodiment is replaced with a variable gear ratio unit 64. Note that the same reference numerals as in the variable gear ratio unit 14 of the first embodiment denote the same parts in the variable gear ratio unit 64 of the vehicle steering apparatus of the third embodiment, and a detailed description thereof will be omitted.

The variable gear ratio unit 64 comprises a motor 40 as in the variable gear ratio unit 14 of the first embodiment, and a reducing unit is constituted by a harmonic drive reducing unit 66. The harmonic drive reducing unit 66 comprises, as its basic members, a wave generator 68 constituted by an elliptical cam and a ball bearing disposed around the elliptical cam and fixed to the rotating shaft 50, a flexible spline 70 constituted by a metal flexible belt having teeth on its outer circumferential portion, and a rigid circular spline 72 having a ring-like shape fixed to the inner circumferential surface of a motor housing 44 and having teeth formed at the same pitch as that of the teeth of the flexible spline 70.

In this vehicle steering apparatus, when an ECU 28 determines the reverse input from the tire 24 side or the failure of the motor 40 as in the first embodiment, the ECU 28 outputs a control signal to a solenoid 56 to displace a slide pin 54 serving as an engaging member in a direction parallel to the axis of a rotating shaft 50. The slide pin 54 is inserted in a gap formed between the flexible spline 70 and the circular spline 72.

Figure 7:
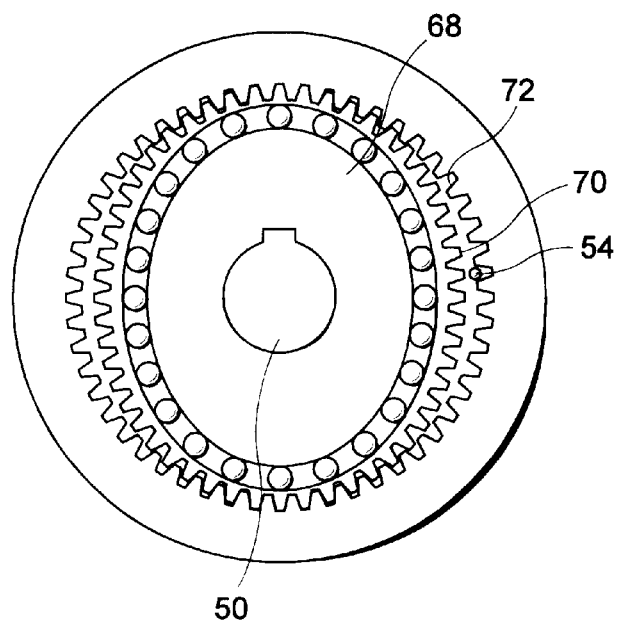
FIG. 7 is a sectional view of the variable gear ratio unit (FIG. 6) of the third embodiment along the line B—B.

When the wave generator 68 rotates together with the rotating shaft 50 in this state, the slide pin 54 is fitted between the wave generator 68 and the circular spline 72 shown in FIG. 7, thereby connecting the motor housing 44 to the rotating shaft 50 of the motor 40.

The gear ratio change operation of the variable gear ratio unit 64 is stopped, and a steering wheel 10 is directly connected to the tires 24. Even if a reverse input acts from the tire 24 side, a phase shift by the reverse input can be prevented.

Figure 8:
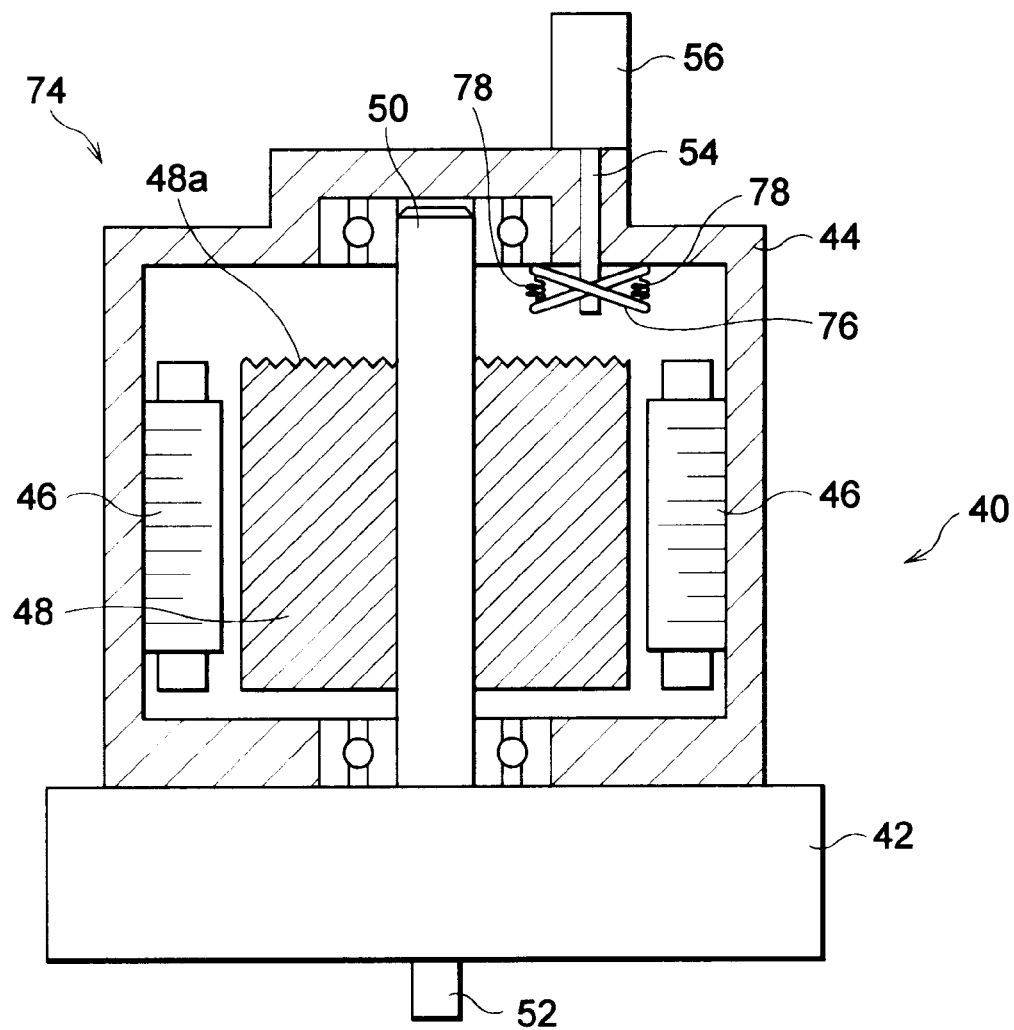
FIG. 8 is a sectional view showing the structure of the variable gear ratio unit of a vehicle steering apparatus according the fourth embodiment.
Figure 9:
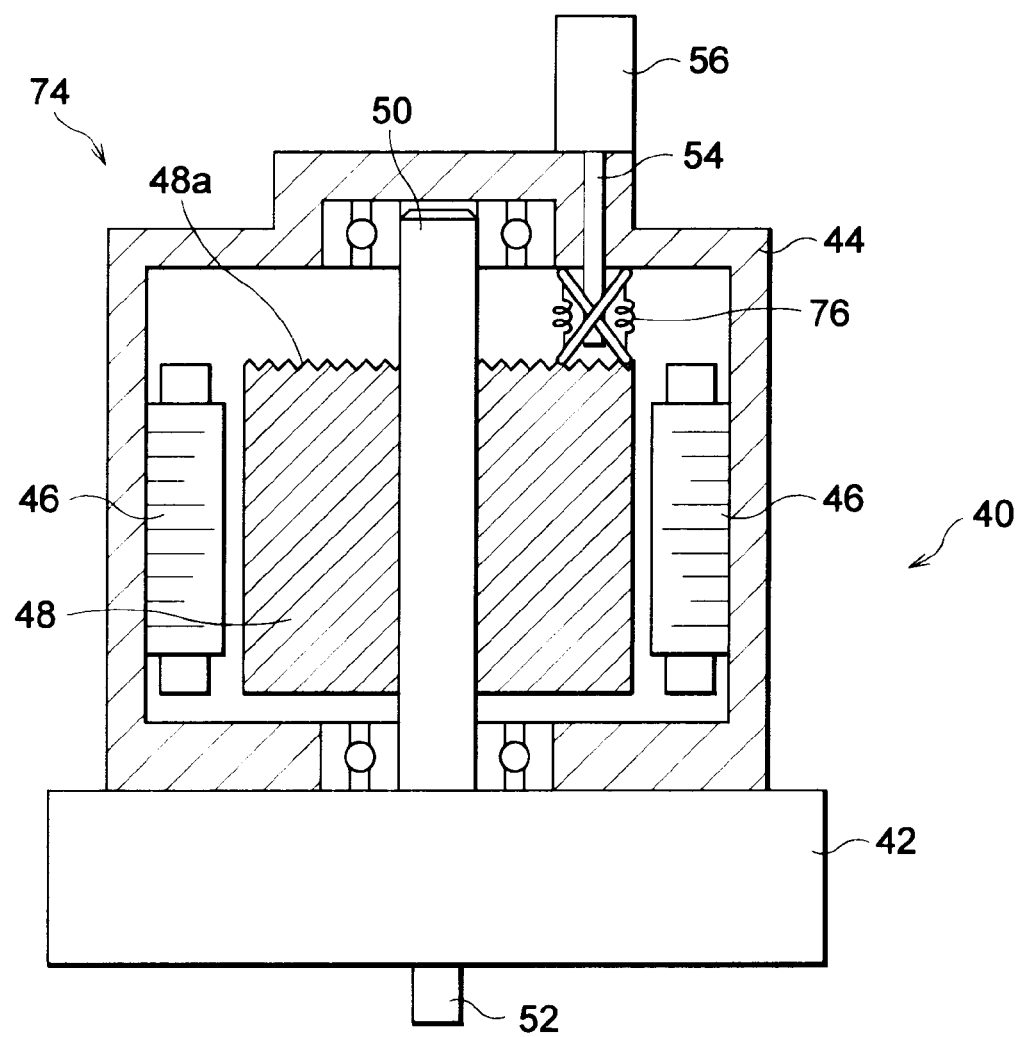
FIG. 9 is a sectional view showing the actuated state of the variable gear ratio unit of the fourth embodiment.

A vehicle steering apparatus according to the fourth embodiment of the present invention will be described with reference to FIGS. 8 and 9. This vehicle steering apparatus is different from that of the first embodiment in that the variable gear ratio unit 14 of the vehicle steering apparatus of the first embodiment is replaced with a variable gear ratio unit 74. Note that the same reference numerals as in the variable gear ratio unit 14 of the first embodiment denote the same parts in the variable gear ratio unit 74 of the vehicle steering apparatus of the fourth embodiment, and a detailed description thereof will be omitted.

The variable gear ratio unit 74 comprises a motor 40 and a reducing unit 42 as in the variable gear ratio unit 14 of the first embodiment. The connecting means of the variable gear ratio unit 74 comprises links 76 unlike the first embodiment. More specifically, as shown in FIG. 8, the connecting means comprises the two links 76 axially supported at the distal end portion of a pin 54 driven by a solenoid 56, and spring members 78 so disposed as to extend the distal ends of the two links 76 downward. In other words, the connecting means comprises the extendible members constituted by the two links 76, and a driving means constituted by the solenoid 56, the pin 54, and the spring members 78. An upper surface 48a of a rotor 48 is corrugated to form a friction surface.

In this vehicle steering apparatus, when an ECU 28 determines the reverse input from the tire 24 side or the failure of the motor 40 as in the first embodiment, the ECU 28 outputs a control signal to the solenoid 56 to displace the slide pin 54 in a direction parallel to the axis of a rotating shaft 50. The slide pin 54 extends the link members of the links 76 to press the distal ends of the link members against the friction surface formed on the upper surface 48a of the rotor 48, as shown in FIG. 9, thereby connecting a motor housing 44 to the rotating shaft 50 of the motor 40.

The actuation of the variable gear ratio unit 74 is stopped, and a steering wheel 10 is directly connected to tires 24. Even if an excessive reverse input acts from the tire 24 side, a phase shift by the reverse input can be prevented. Since the moving span of the links 76 is larger than the stroke of the pin 54 in this connecting means, the solenoid 56 need not move the pin 54 in a large stroke. Therefore, the solenoid can be made compact.

In the variable gear ratio unit of each embodiment described above, the connecting means has the single pin 54, and this pin is displaced by the solenoid 56 to directly connect the steering wheel 10 to the tires 24. However, the connecting means may have a plurality of pins, and these pins may be displaced by a solenoid to directly connect the steering wheel to the tires. In this case, the steering wheel can be reliably directly connected to the tires as compared with the embodiments described above.

In the second embodiment, the elliptical cam 62 is mounted on the upper surface of the rotor 48. However, an elliptical cam may be mounted in the rotary portion of the reducing unit 42, and the pin 54 may be inserted between the elliptical cam and the motor housing to directly connect the steering wheel to the tires.

Figure 10:
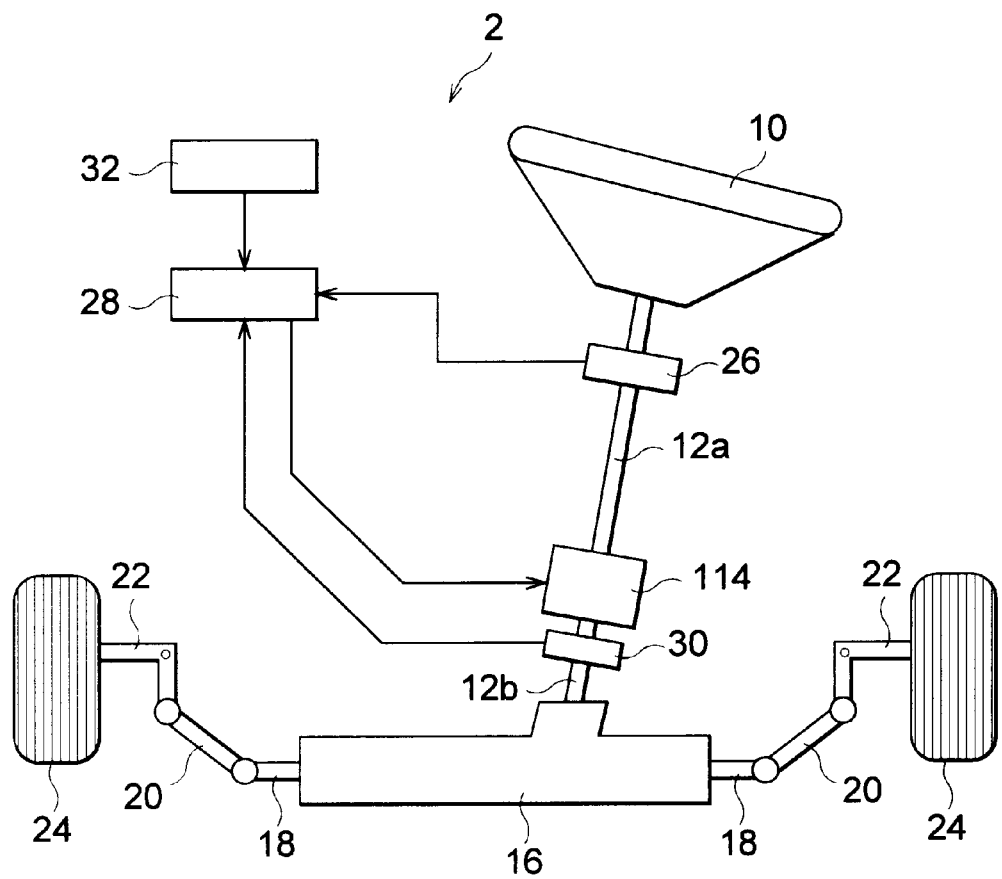
FIG. 10 is a view showing the structure of a vehicle steering apparatus according to the fifth embodiment.

A vehicle steering apparatus according to the fifth embodiment of the present invention will be described with reference to FIGS. 10 to 13. The vehicle steering apparatus of this embodiment is different from that of the first embodiment in that the variable gear ratio unit 14 of the vehicle steering apparatus of the first embodiment is replaced with a variable gear ratio unit 114, as shown in FIG. 10.

Figure 11:
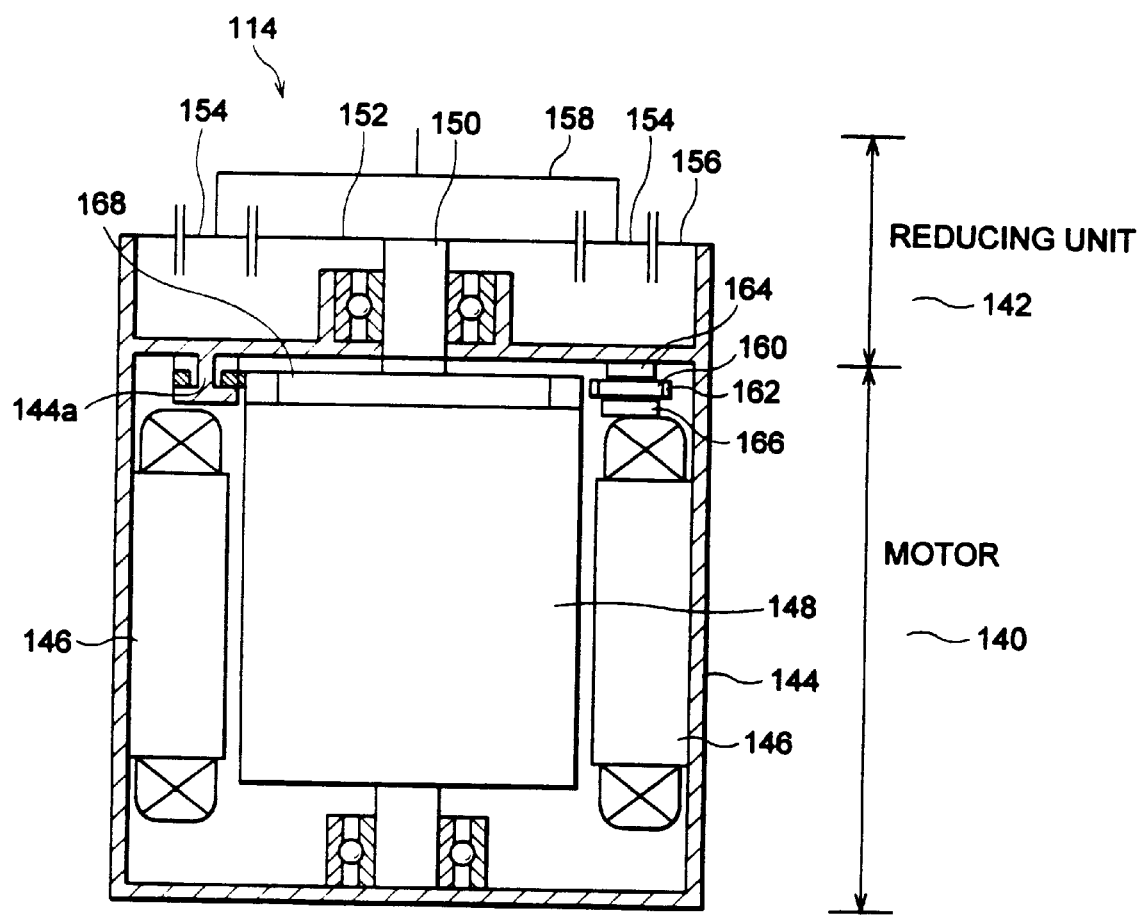
FIG. 11 is a sectional view showing the structure of the variable gear ratio unit of the vehicle steering apparatus according to the fifth embodiment.

As shown in FIG. 11, the variable gear ratio unit 114 comprises a motor 140 and a reducing unit 142. The motor 140 comprises a stator 146 and a rotor 148 which are mounted in a motor housing 144. The reducing unit 142 is a reducing unit using a planetary gear mechanism. More specifically, a rotating shaft 150 rotating together with the rotor 148 is fixed to a sun gear 152, and a planet gear 154 meshes with the sun gear 152 and a ring gear 156 formed on the inner circumferential surface of the motor housing 144. The planet gear 154 is rotatably mounted on a carrier 158.

Figure 12:
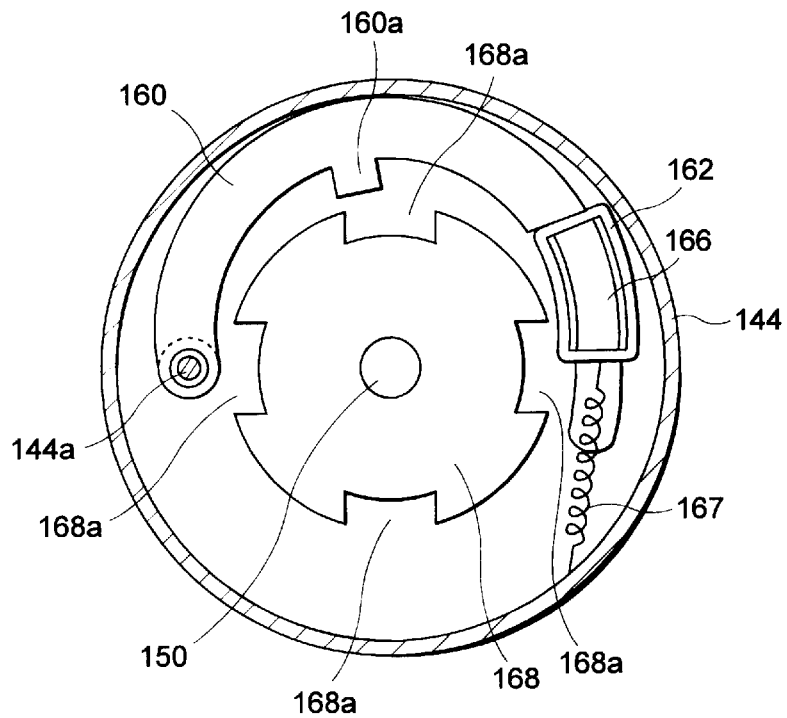
FIG. 12 is a schematic view showing the locking mechanism of the variable gear ratio unit according to the fifth embodiment.
Figure 13:
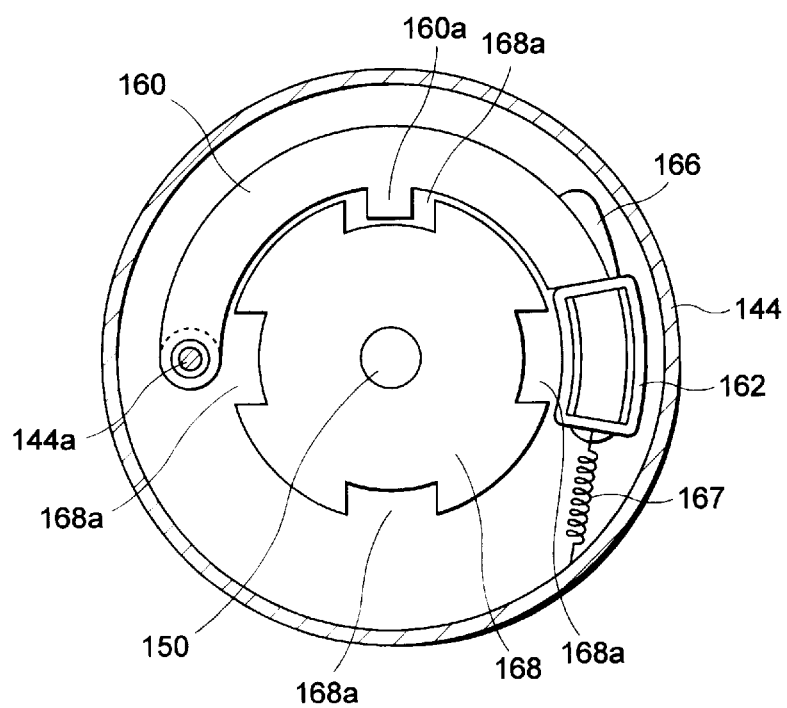
FIG. 13 is a schematic view showing the actuated state of the rotary and swinging members of the locking mechanism of the variable gear ratio unit according to the fifth embodiment.

A locking mechanism shown in FIG. 12 is arranged on the rotor 148 in the motor housing 144. More specifically, an arcuated swinging member 160 having an engaging projection 160a in the arcuated inner portion is disposed on the rotor 148 in the motor housing 144. One end of the swinging member 160 is swingably connected to a pin 144a of the motor housing 144. The other end of the swinging member 160 has an electromagnetic coil 162. A flat magnet 164 fixed to the motor housing 144 opposes the upper portion of the electromagnetic coil 162. A metal plate 166 fixed to the stator 146 opposes the lower portion of the electromagnetic coil 162.

One end of a spring member 167 is attached to the end of the swinging member 160 which has the electromagnetic coil 162. The other end of the spring member 167 biases the swinging member 160 mounted on the inner wall surface of the motor housing 144 toward the rotating shaft 150.

A rotary member 168 fixed to the rotating shaft 150 and rotating together with the rotor 148 is disposed on the upper surface of the rotor 148 of the motor 140. Several (four in FIGS. 12 and 13) engaging recesses 168a adapted to selectively engage with the engaging projection 160a of the swinging member 160 are formed in the rotary member 168.

The motor housing 144 on the motor 40 side is connected to the upper end of a lower steering shaft 112b. The carrier 158 is connected to the lower end of an upper steering shaft 112a through a universal joint (not shown).

In this vehicle steering apparatus 2, when a vehicle speed detected by a vehicle speed sensor 32 and a steering angle detected by a steering angle sensor 26 are input to an ECU 28, the ECU 28 calculates a target turning angle on the basis of the vehicle speed and the steering angle and outputs a signal based on this target turning angle to the variable gear ratio unit 114. The motor 140 of the variable gear ratio unit 114 is driven on the basis of this control signal to supply a turning angle corresponding to the target turning angle to tires 24.

In this vehicle steering apparatus 2, the ECU 28 determines the presence/absence of a reverse input (kick back) from the tire 24 side and the failure of the motor 140. More specifically, when the difference between the turning angle of the tire 24 which is detected by an output angle sensor 30 and the target turning angle calculated on the basis of the steering angle of a steering wheel 10 which is detected by the steering angle sensor 26 and the vehicle speed detected by the vehicle speed sensor 32 is equal to or larger than a predetermined value, the ECU 28 determines the presence of an excessive reverse input from the tire 24 side. The ECU 28 determines the failure of the motor 140 on the basis of a current value supplied to the motor 140. The failure of the motor 140 includes motor locking upon catching a foreign object, the failures of the ECU 28, the steering sensor 26, and the output sensor 30, and the like.

When the ECU 28 determines the absence of an excessive reverse input from the tire 24 side and the normal operation of the motor 140, the ECU 28 energizes the electromagnetic coil 162 to allow the electromagnetic coil 162 to generate a force along the metal plate 166, as shown in FIG. 12. The swinging member 160 then swings toward the direction of the inner wall of the motor housing 144, i.e., a direction away from the rotary member 168 against the spring force of the spring member 167. The engaging projection 160a of the swinging member 160 is disengaged from the corresponding engaging recess 168a of the rotary member 168.

The absence of the excessive reverse input from the tire 24 side and the normal operation of the motor 140 allow turning of the tires 24 through the variable gear ratio unit at a transmission ratio obtained based on the vehicle speed.

When the ECU 28 determines the presence of the excessive reverse input from the tire 24 side or the failure of the motor 140, the ECU 28 stops energizing the electromagnetic coil 162 to swing the swinging member about the pin 144a by the spring force of the spring member 167 toward the rotary member 168, thereby engaging the engaging projection 160a of the swinging member 160 with the corresponding engaging recess 168a of the rotary member 168. More specifically, when the swinging member 160 swings toward the rotary member 168, and the engaging projection 160a of the swinging member 160 matches one of the positions of the engaging recesses 168a of the rotary member 168, the engaging projection 160a directly engages with the corresponding engaging recess 168a. When the position of the engaging projection 160a of the swinging member 160 does not match one of the positions of the engaging recesses 168a of the rotary member 168, the rotary member 168 rotates to a position where the engaging projection 160a matches one of the engaging recesses 168a, and the engaging projection 160a engages with the corresponding engaging recess 168a.

When the ECU 28 determines the presence of the excessive reverse input from the tire 24 side or the failure of the motor 140, the motor housing 144 is directly connected to the rotor 148. Therefore, the actuation of the variable gear ratio unit 114 is stopped, and the steering wheel 10 is directly connected to the tires 24. Even if an excessive reverse input acts from the tire 24 side, a phase shift by the reverse input can be prevented.

Since the steering wheel 10 is directly connected to the tires 24 upon failure of the motor 140, steering at the fixed transmission ratio is allowed even in the failure of the motor 140.

The direct connection mechanism for directly connecting the motor housing 144 to the rotating shaft 150 of the motor 140 has the magnet 164 and the electromagnetic coil 162 arranged in the swinging member 160. Because the swinging member 160 may swing in a large way in accordance with an electric current that flows through electromagnetic coil 162, the structure can be made more compact than a structure using a solenoid actuator or the like.

When the ECU determined the absence of the excessive reverse input from the tire 24 side and elimination of the failure of the motor 140, the ECU 28 energizes the electromagnetic coil again. The engaging projection 160a of the swinging member 160 is disengaged from the corresponding engaging recess 168a of the rotary member 168. Therefore, actuation of the variable gear ratio unit 114 is restarted.

In the above embodiment, the housing 144 on the motor 40 side is connected to the upper end of the lower steering shaft 112b, and the carrier 158 is connected to the lower end of the upper steering shaft 112a. This connection relationship may be reversed to attain the same control as in the above embodiment in the variable gear ratio unit 114.

In the above embodiment, the metal plate 166 opposes the stator 146 under the electromagnetic coil 162. However, this metal plate may be replaced with a magnet. In this case, the magnetic flux increases to increase the force for swinging the swinging member 160. In addition, the metal plate 166 fixed to the stator 146 below the electromagnetic coil 162 may be omitted.

In the above embodiment, the swinging member 160 has the electromagnetic coil 162, and the motor housing 144 has the magnet 164. However, the motor housing 144 may have the electromagnetic coil 162, and the swinging member 160 may have the magnet 164.

In the above embodiment, one end of the spring member 167 is attached to the end portion of the swinging member 160 which has the electromagnetic coil 162, and the swinging member 160 is biased by this spring member 167 toward the rotating shaft 150. However, the swinging member 160 may be biased by the spring member 167 toward the motor housing 144. In this case, when the ECU 28 determines the presence of the excessive reverse input from the tire 24 side, or the like, energization of the electromagnetic coil 162 is started to swing the swinging member 160 toward the rotary member 168 against the spring force of the spring member 167, thereby engaging the engaging projection 160a of the swinging member 160 with the corresponding engaging recess 168a of the rotary member 168.

Figure 14:
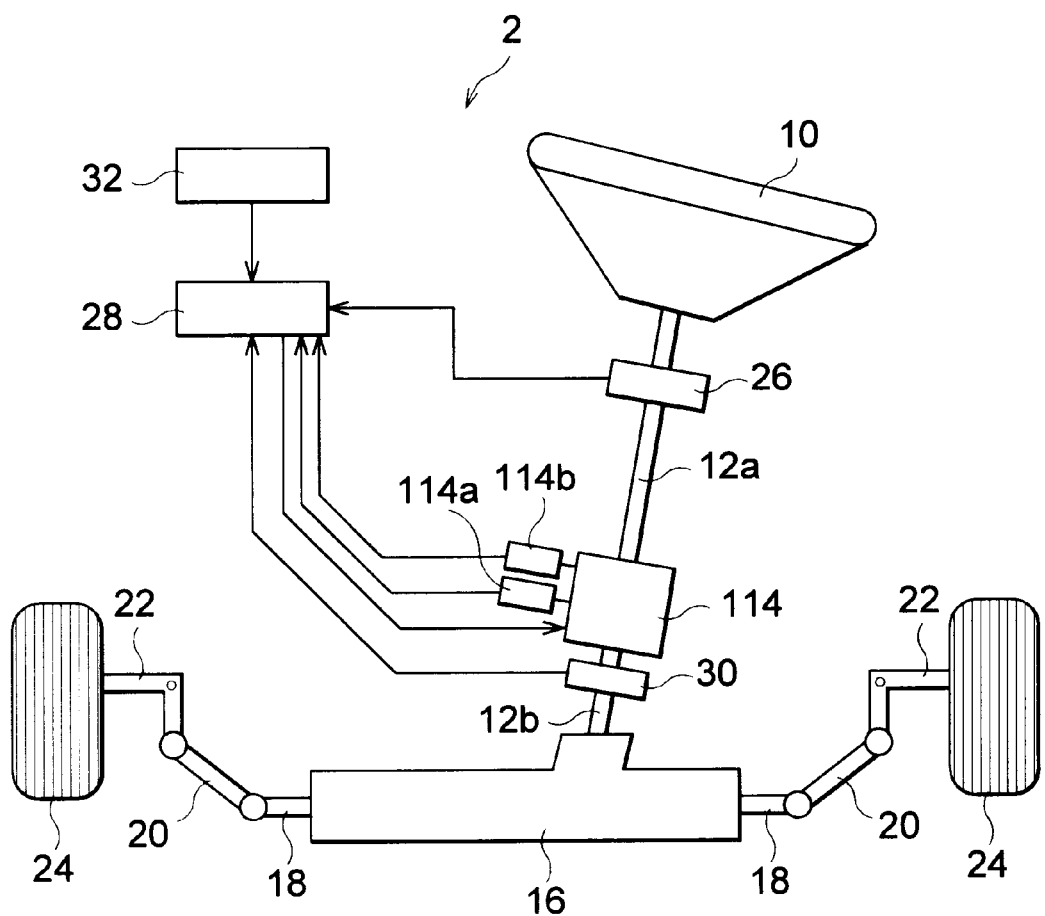
FIG. 14 is a view showing the structure of a vehicle steering apparatus according to the sixth embodiment.

A vehicle steering apparatus 4 according to the sixth embodiment of the present invention will be described with reference to FIGS. 14 to 16. As shown in FIG. 14, the vehicle steering apparatus 4 of the sixth embodiment is different from that of the fifth embodiment in that a speed detection device 114a constituting the variable gear ratio unit 114 of the vehicle steering apparatus 2 of the fifth embodiment to detect the motor speed, and a rotational direction detection device 114b for detecting the rotational direction of the motor are added to the variable gear ratio unit 114 of the vehicle steering apparatus 2 of the fifth embodiment. The remaining arrangement is the same as that of the vehicle steering apparatus 2 of the fifth embodiment. The same reference numerals in the vehicle steering apparatus 2 of the fifth embodiment in FIGS. 11 to 13 denote the same parts in the sixth embodiment.

Figure 15:
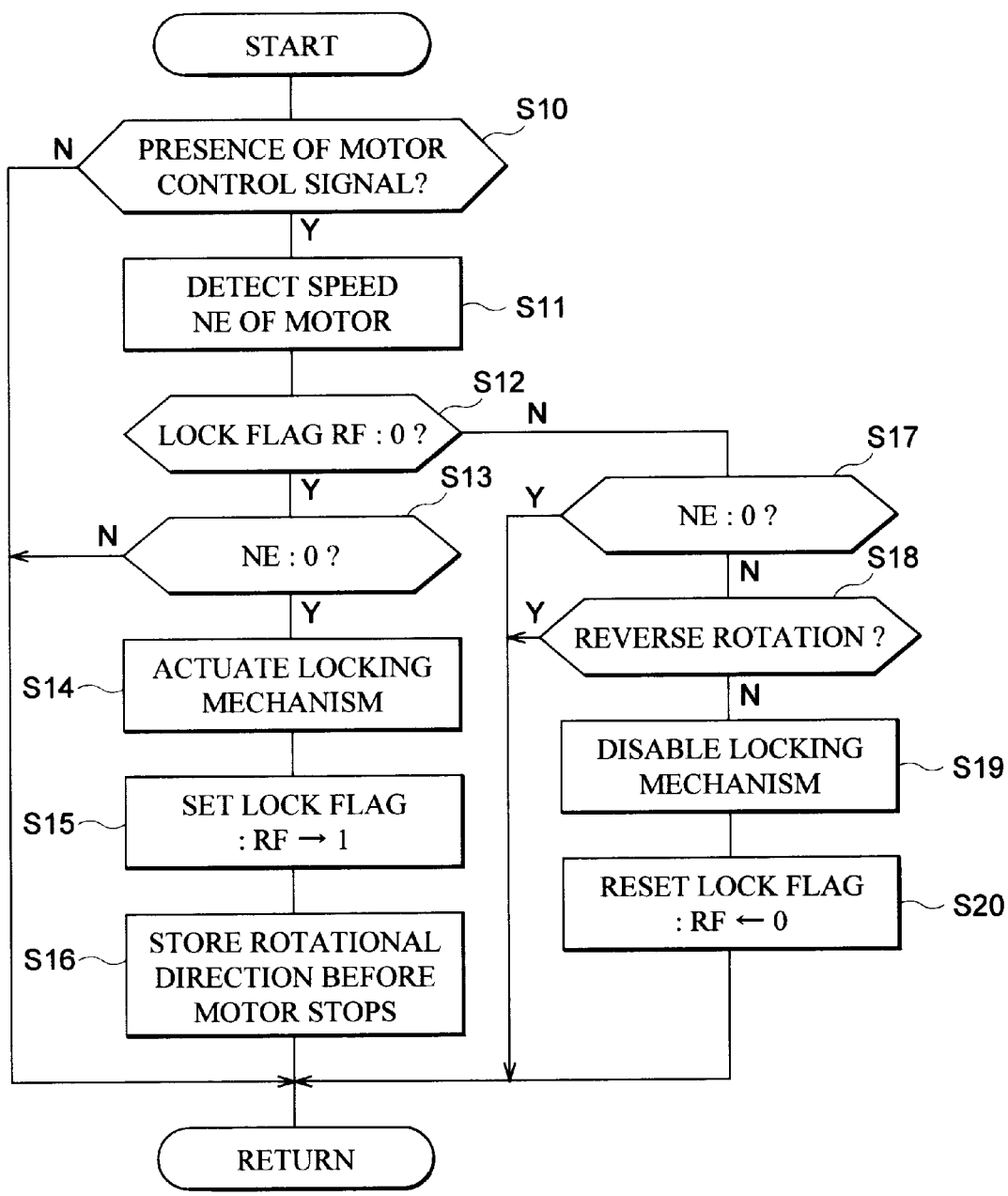
FIG. 15 is a flow chart for explaining control of the vehicle steering apparatus according to the sixth embodiment.
Figure 16:
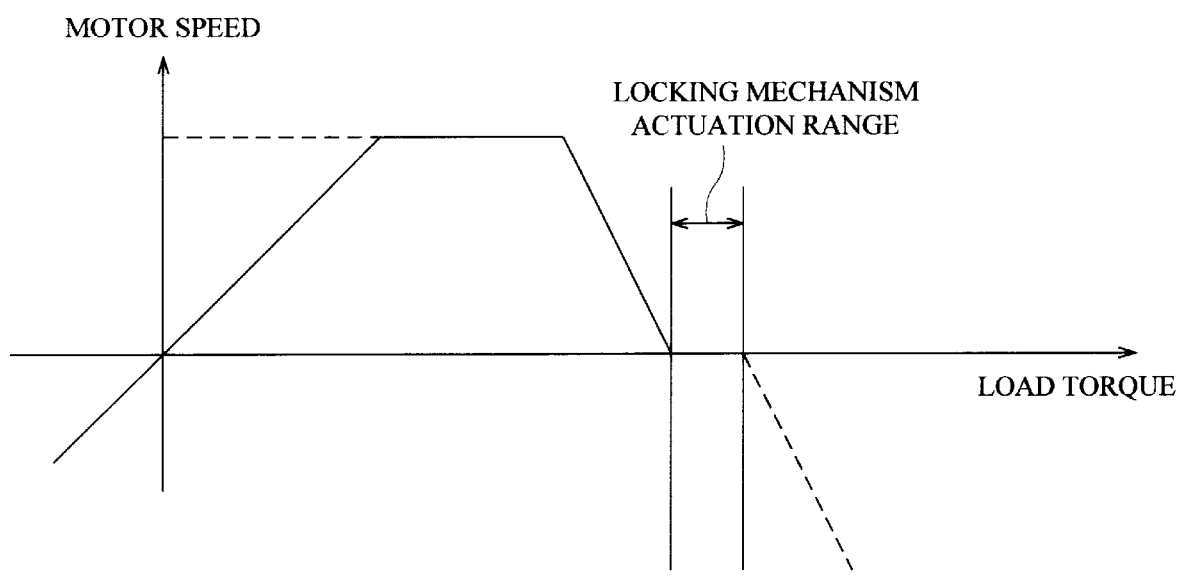
FIG. 16 is a view for explaining a locking mechanism actuation range for actuating the locking mechanism of the vehicle steering apparatus according to the sixth embodiment.

As shown in FIG. 15, when an ECU 28 of the vehicle steering apparatus 4 outputs a control signal to a motor 140 of a variable gear ratio unit 114 (step S10), the ECU 28 detects a speed NE of the motor 140 by the speed detection device 114a (step S11).

The ECU 28 then determines whether a lock flag RF is zero, i.e., the lock flag RF is reset (step S12). If YES in step S12, the ECU 28 determines whether the speed NE of the motor 140 detected in step S11 is zero (step S13). If YES in step S13, the locking mechanism is actuated (step S14). More specifically, energization of an electromagnetic coil 162 of the variable gear ratio unit 114 is stopped, and a swinging member is swung about a pin 144a by the spring force of a spring member 167 toward a rotary member 168 to engage an engaging projection 160a of a swinging member 160 with a corresponding one of engaging recesses 168a of the rotary member 168 (see FIG. 13). As shown in FIG. 16, a load torque acting on the motor 140 increases to decrease the speed of the motor 140. In addition, when the speed of the motor 140 becomes zero, i.e., in the locking mechanism actuation range, a motor housing 144 is directly connected to a rotor 148.

The ECU 28 then sets the lock flag RF (step S15) and stores the rotational direction detected by the rotational direction detection device 114b immediately before the motor 140 stops (step S16).

When the ECU 28 determines in step S12 that the lock flag RF is not zero, i.e., the lock flag RF is set, the ECU 28 determines whether the speed NE of the motor 140 detected in step S11 is zero (step S17). If the ECU 28 determines that the speed NE of the motor 140 is not zero (the motor 140 starts rotating), the ECU 28 determines whether the rotational direction of the motor 140 which is detected by the rotational direction detection device 114b is reverse to the rotational direction stored in step S16 (step S18).

When the ECU 28 determines that the motor 140 starts rotating in the reverse direction, the ECU 28 continues to lock the locking mechanism. However, when the ECU 28 determines that the motor 140 starts rotating in the forward direction, the ECU 28 releases locking of the locking mechanism (step S19). That is, the ECU 28 starts energizing the electromagnetic coil 162 of the variable gear ratio unit 114 to swing the swinging member 160 about the pin 144a against the spring force of the spring member 167 in a direction away from the rotary member 168. The engaging projection 160a of the swinging member 160 is disengaged from the corresponding engaging recess 168a of the rotary member 168 (see FIG. 12). The lock flag RF is then reset (step S20).

Even if an excessive load torque acts on the motor 140 of the variable gear ratio unit 114, reverse rotation of the motor 140 by this load torque can be prevented. Even in a state wherein the excessive load torque acts on the motor 140, the driver can turn a steering wheel 10. Since the locking mechanism is enabled or disabled in the stop state of the motor 140, an impact does not act on the steering wheel 10. In addition, the number of circuits for driving the locking mechanism can be reduced to one to reduce the manufacturing cost.

Figure 17:
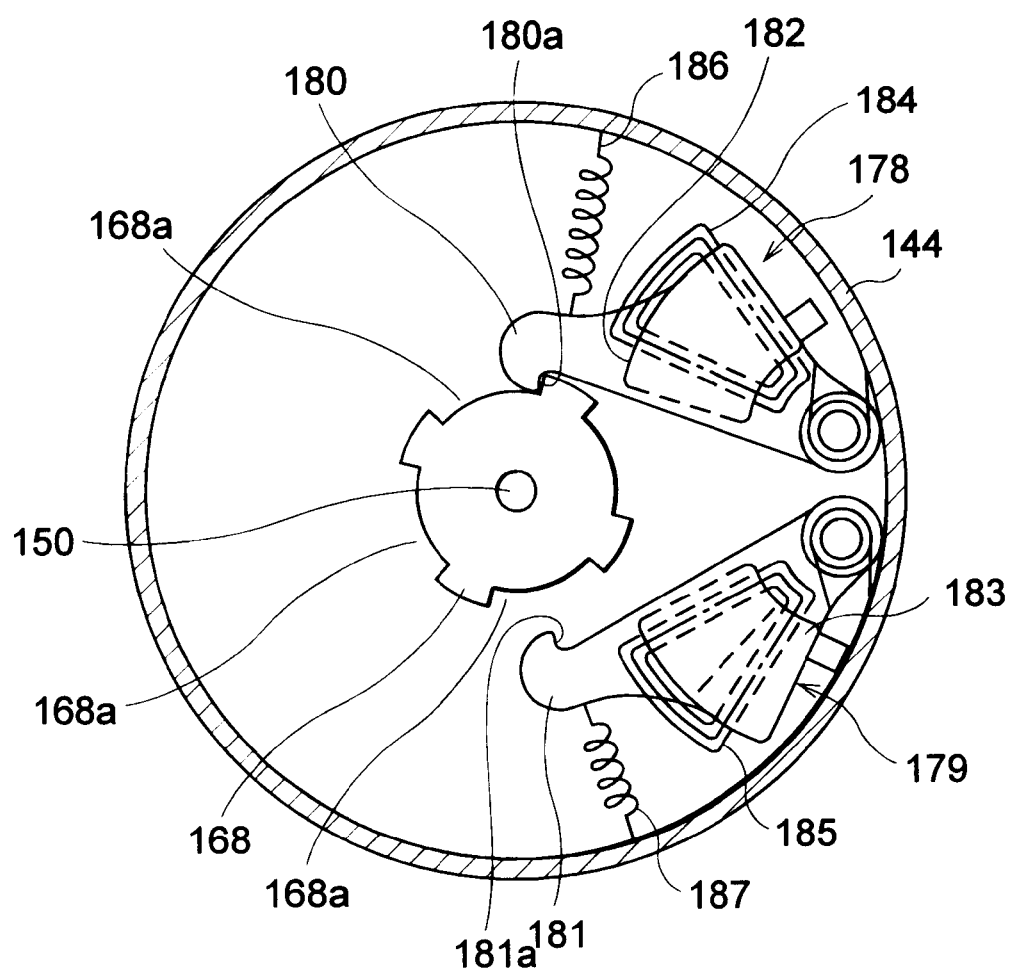
FIG. 17 is a schematic view of the locking mechanism of a variable gear ratio unit according to the seventh embodiment.

A vehicle steering apparatus according to the seventh embodiment of the present invention will be described with reference to FIGS. 17 to 19. The vehicle steering apparatus according to the seventh embodiment is different from the vehicle steering apparatus of the fifth embodiment in that the locking mechanism of the vehicle steering apparatus 2 of the fifth embodiment is replaced with a locking mechanism shown in FIG. 17. The remaining arrangement is the same as that of the vehicle steering apparatus 2 of the fifth embodiment, and the same reference numerals as in the vehicle steering apparatus 2 of the fifth embodiment in FIGS. 11 to 13 denote the same parts in the seventh embodiment.

This locking mechanism comprises a pair of locking mechanisms 178 and 179 each of which allows rotation in one direction. More specifically, one end of one locking mechanism 178 (clockwise rotation is allowed) comprises a swinging member 180 having one end swingably attached to a motor housing 144 and the other end having an engaging portion 180a, a magnet 182 fixed to the swinging member 180, an electromagnetic coil 184 fixed to the motor housing 144, and a spring member 186 for connecting the motor housing 144 to the swinging member 180. The other locking mechanism (counterclockwise rotation is allowed) comprises a swinging member 181 having one end swingably connected to the motor housing 144 and the other end having an engaging portion 181a, a magnet 183 fixed to the swinging member 181, an electromagnetic coil 185 fixed to the motor housing 144, and a spring member 187 for connecting the motor housing 144 to the swinging member 181.

Figure 18:
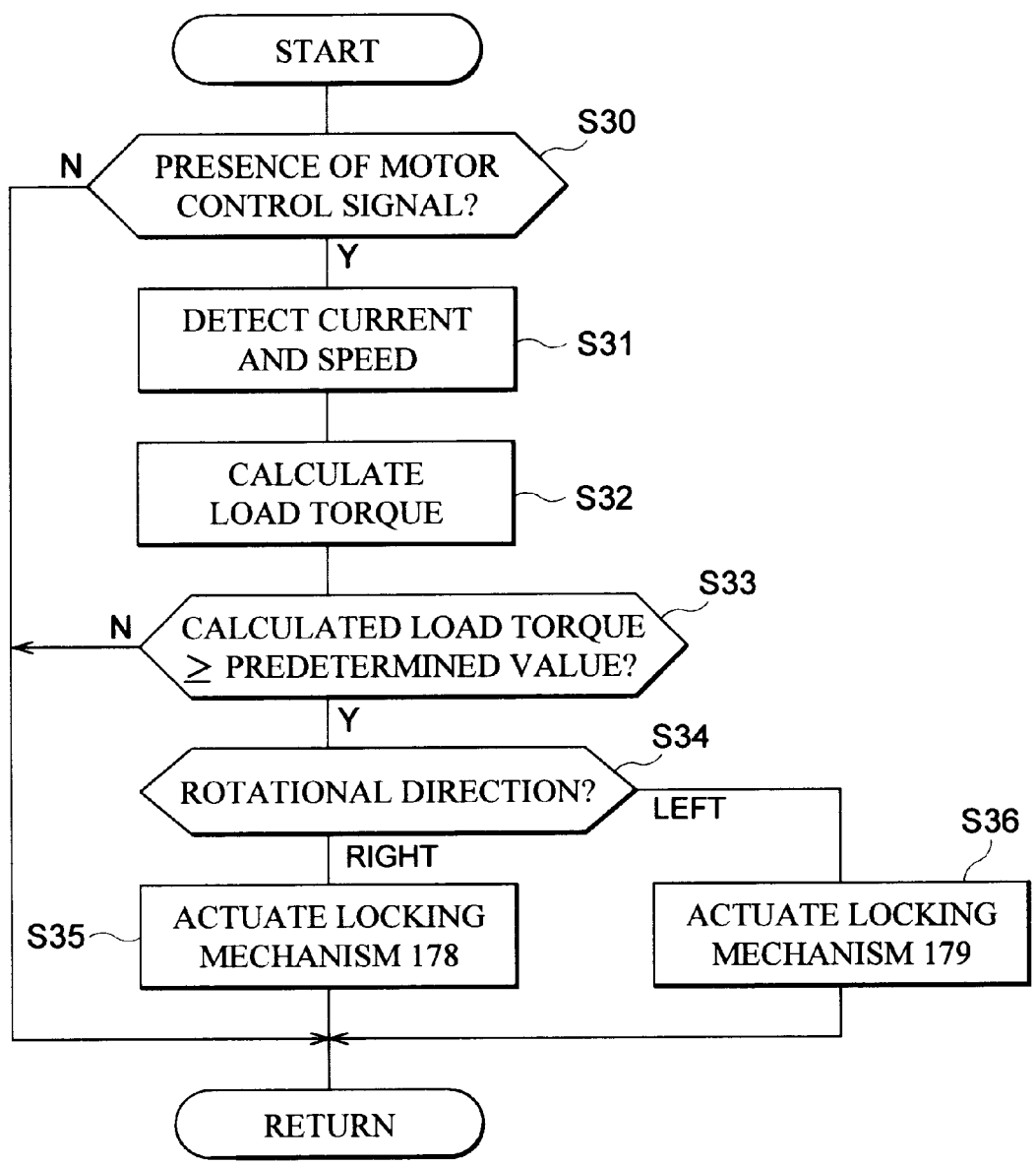
FIG. 18 is a flow chart for explaining control of the vehicle steering apparatus according to the seventh embodiment.

When an ECU 28 of the vehicle steering apparatus of the seventh embodiment outputs a control signal to the motor 140 of the variable gear ratio unit 114 (step S30), as shown in FIG. 18, the ECU 28 detects a current value supplied to the motor 140 and causes a speed detection device 114a to detect a speed NE of the motor 140 (step S31). The ECU 28 then calculates a load torque acting on the motor 140 (step S32). That is, the ECU 28 calculates the load torque on the basis of the detected current value and the speed NE of the motor 40.

When the calculated load torque is equal to or larger than a predetermined value (step S33), the ECU 28 causes a rotational direction detection device 14b to detect the rotational direction of the motor 140 (step S34). When the rotational direction of the motor 140 is determined to be clockwise, the locking mechanism 178 is actuated (step S35). That is, the ECU 28 starts energizing the electromagnetic coil 184 constituting the locking mechanism 178 to swing the swinging member 180 against the spring force of the spring member 186 toward a rotary member 168. The engaging portion 180a of the swinging member 180 is fitted in an engaging recess 168a of the rotary member 168 (see FIG. 17).

In this case, when the motor 140 continues to rotate clockwise, rotation of the motor 140 is not limited by the locking mechanism 178. When the motor 140 starts rotating counterclockwise, i.e., starts rotating in the reverse direction, rotation of the motor 140 is limited by the locking mechanism 178.

When the ECU 28 determines in step S34 that the rotational direction of the motor 140 is counterclockwise, the locking mechanism 179 is actuated (step S36). The ECU 28 starts energizing the electromagnetic coil 185 constituting the locking mechanism 179 to swing the swinging member 181 against the spring force of the spring member 187 toward the rotary member 168, thereby fitting the engaging portion 181a of the swinging member 181 in the engaging recess 168a of the rotary member 168. In this case, when the motor 140 continues to rotate counterclockwise, rotation of the motor 140 is not limited by the locking mechanism 179. When the motor 140 starts rotating clockwise, i.e., starts rotating in the reverse direction, rotation of the motor 140 is limited by the locking mechanism 179.

Figure 19:
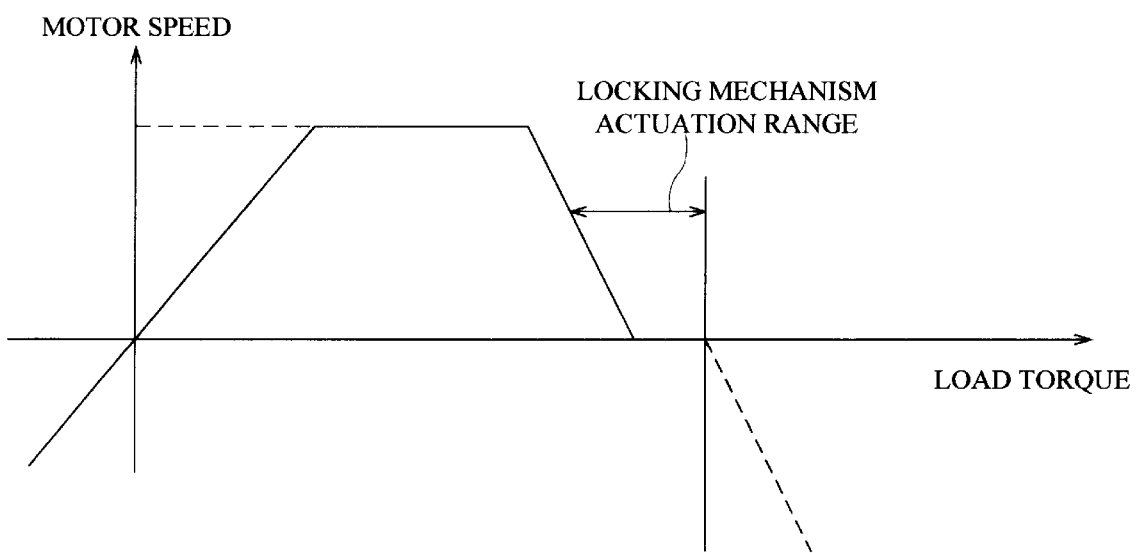
FIG. 19 is a view for explaining the locking mechanism actuation range for actuating the locking mechanism of the vehicle steering apparatus according to the seventh embodiment.

As shown in FIG. 19, when a speed of the motor 140 is reduced due to an increasing load torque acting on the motor 140, i.e., in the locking mechanism actuation range, the motor housing 144 is engaged with the rotor 148 to prevent reverse rotation of the motor. Since the locking mechanism is constituted by the pair of locking mechanisms 178 and 179 each of which allows rotation in one direction, the locking mechanism can be actuated during rotation of the motor 140, thereby increasing the locking mechanism actuation range.

According to the vehicle steering apparatus of this embodiment, the relative rotation limiting means for limiting relative rotation between the motor housing and the motor rotating shaft is constituted by the pair of one-direction limiting mechanisms each of which allows rotation in one direction. Clockwise rotation of the motor is limited by one one-direction limiting mechanism, while counterclockwise rotation of the motor is limited by the other one-direction limiting mechanism. When clockwise rotation changes to counterclockwise direction, and vice versa, one of the pair of one-direction limiting mechanisms can limit reverse driving of the motor.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claim.

What is claimed is:

1. A vehicle steering apparatus for use with a steering wheel and a tire, comprising:

a steering transmission system that connects the steering wheel and the tire;

transmission ratio change means for changing a transmission ratio from the steering wheel to the tire, the transmission ratio change means including a motor that changes the transmission ratio, the transmission ratio change means being disposed along the steering transmission system so as to separate the steering transmission system into a section at the steering wheel and a section at the tire;

connecting means for stopping actuation of said motor and connecting the section of the steering transmission system at the steering wheel to the section of the steering transmission system at the tire at a fixed transmission ratio based on an external signal; and wherein said connecting means further comprises a rotary member formed on a rotating shaft side of said motor, and a relative rotation limiting means for limiting relative rotation between a housing of said motor and said rotary member, said rotary member has an engaging portion, said relative rotation limiting means comprises a swinging member having one end swingably attached to said housing of said motor and said swinging member engages with said engaging portion so as to limit the rotation of said rotary member.

* * * * *